(12) United States Patent
Chiles et al.

(10) Patent No.: US 6,363,423 B1
(45) Date of Patent: Mar. 26, 2002

(54) SYSTEM AND METHOD FOR REMOTELY GENERATING, ASSIGNING AND UPDATING NETWORK ADAPTER CARD IN A COMPUTING SYSTEM

(75) Inventors: David C. Chiles, Mitchellville, MD (US); Roderick J. Bartlett, Herndon, VA (US); Vikas Puri, Bethesda, MD (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/299,484

(22) Filed: Apr. 26, 1999

(51) Int. Cl.[7] .............................................. G06F 13/00
(52) U.S. Cl. .......................................... 709/224; 710/8
(58) Field of Search ................................ 709/217, 204, 709/221, 245, 224; 370/395, 410, 402; 340/10.1; 710/8; 713/2, 200

(56) References Cited

U.S. PATENT DOCUMENTS

| | | | | |
|---|---|---|---|---|
| 5,572,528 A | * | 11/1996 | Shuen ......................... | 370/402 |
| 5,715,250 A | * | 2/1998 | Watanabe .................... | 370/395 |
| 5,841,991 A | * | 11/1998 | Russell ........................ | 709/221 |
| 5,870,554 A | * | 2/1999 | Grossman et al. ........... | 395/652 |
| 5,912,891 A | * | 6/1999 | Kanai .......................... | 370/395 |
| 5,913,920 A | * | 6/1999 | Adams et al. ............... | 709/204 |
| 6,003,097 A | * | 12/1999 | Richman et al. ................ | 710/8 |
| 6,016,319 A | * | 1/2000 | Kshirsagar et al. .......... | 370/410 |
| 6,021,493 A | * | 2/2000 | Cromer et al. ............... | 713/200 |
| 6,052,779 A | * | 4/2000 | Jackson et al. ................. | 713/2 |
| 6,061,739 A | * | 5/2000 | Reed et al. ................... | 709/245 |
| 6,101,534 A | * | 8/2000 | Rothschild ................... | 709/217 |
| 6,141,686 A | * | 10/2000 | Jackowaki et al. .......... | 709/224 |
| 6,177,860 B1 | * | 1/2001 | Cromer et al. ............. | 340/10.1 |
| 6,195,689 B1 | * | 2/2001 | Bahlmann .................... | 709/217 |

* cited by examiner

Primary Examiner—David Wiley
(74) Attorney, Agent, or Firm—McDonnell Boehnen Hulbert & Berghoff

(57) ABSTRACT

A system and method for retrieving and assigning a unique media access control (MAC) address to a network adapter card in a computer system that uses the network adapter card to connect to a data network. The computer system includes a communications application for invoking a network connection to a remote server. The remote server includes a MAC address list that stores MAC addresses that have been assigned to network adapter cards according to serial numbers. The remote server includes a web page that requests the user to enter a serial number. The remote server uses the serial number to search for a MAC address in the MAC address list. When the remote server finds the serial number, it stores the corresponding MAC address in a file and sends the file name to the user. The user then requests the remote server to download the file by file name, or by FTP URL. The computer system receives the file and an update program reads the MAC address from the file and sends the MAC address to the network adapter card. The network adapter card then stores the MAC address in non-volatile memory.

24 Claims, 3 Drawing Sheets

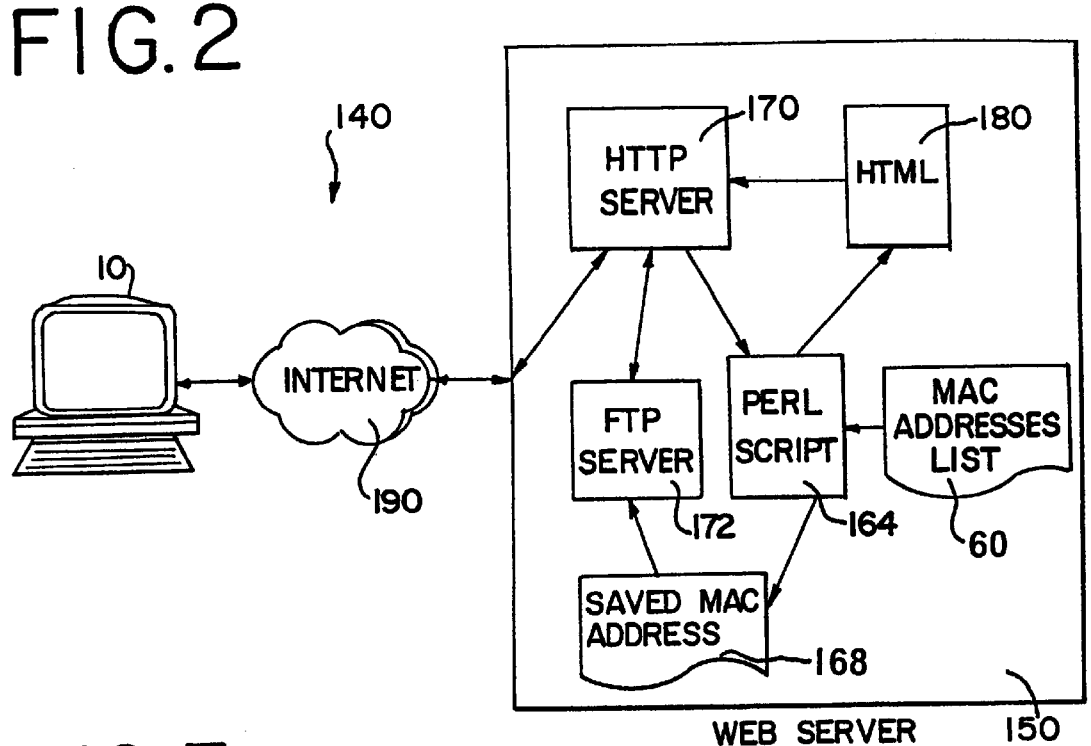
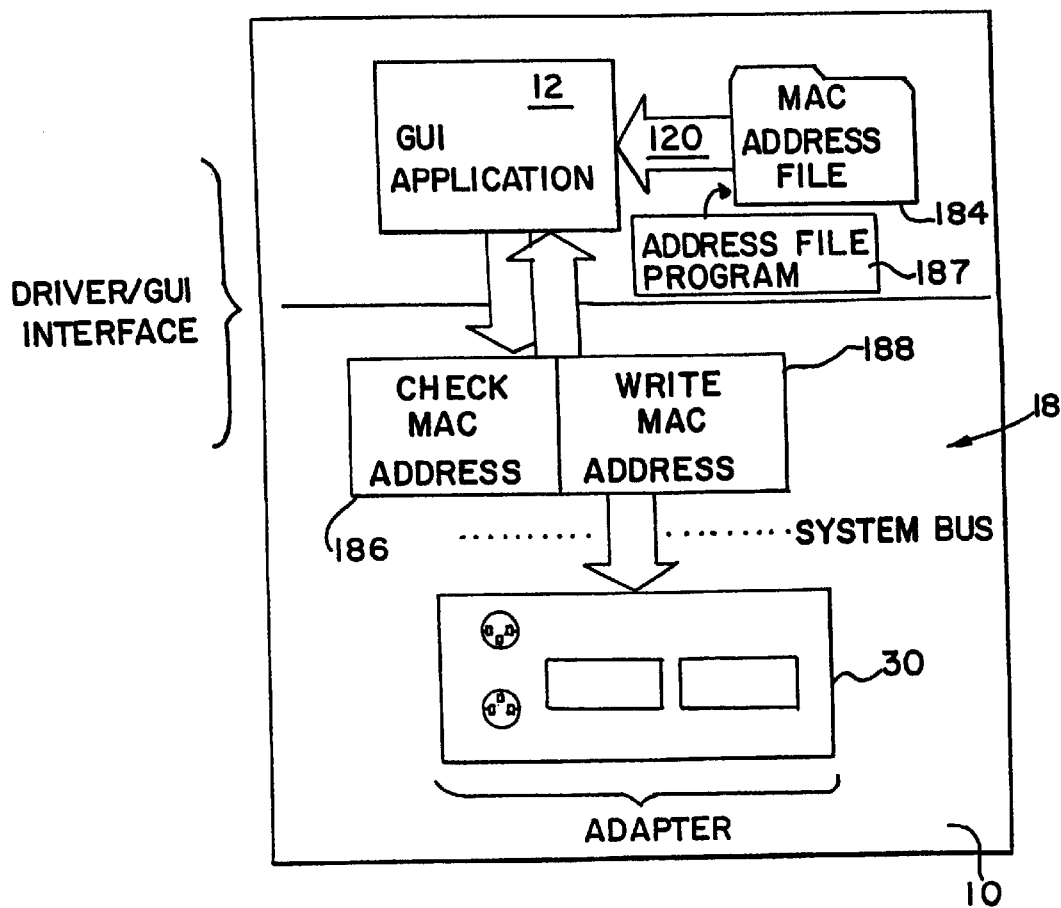

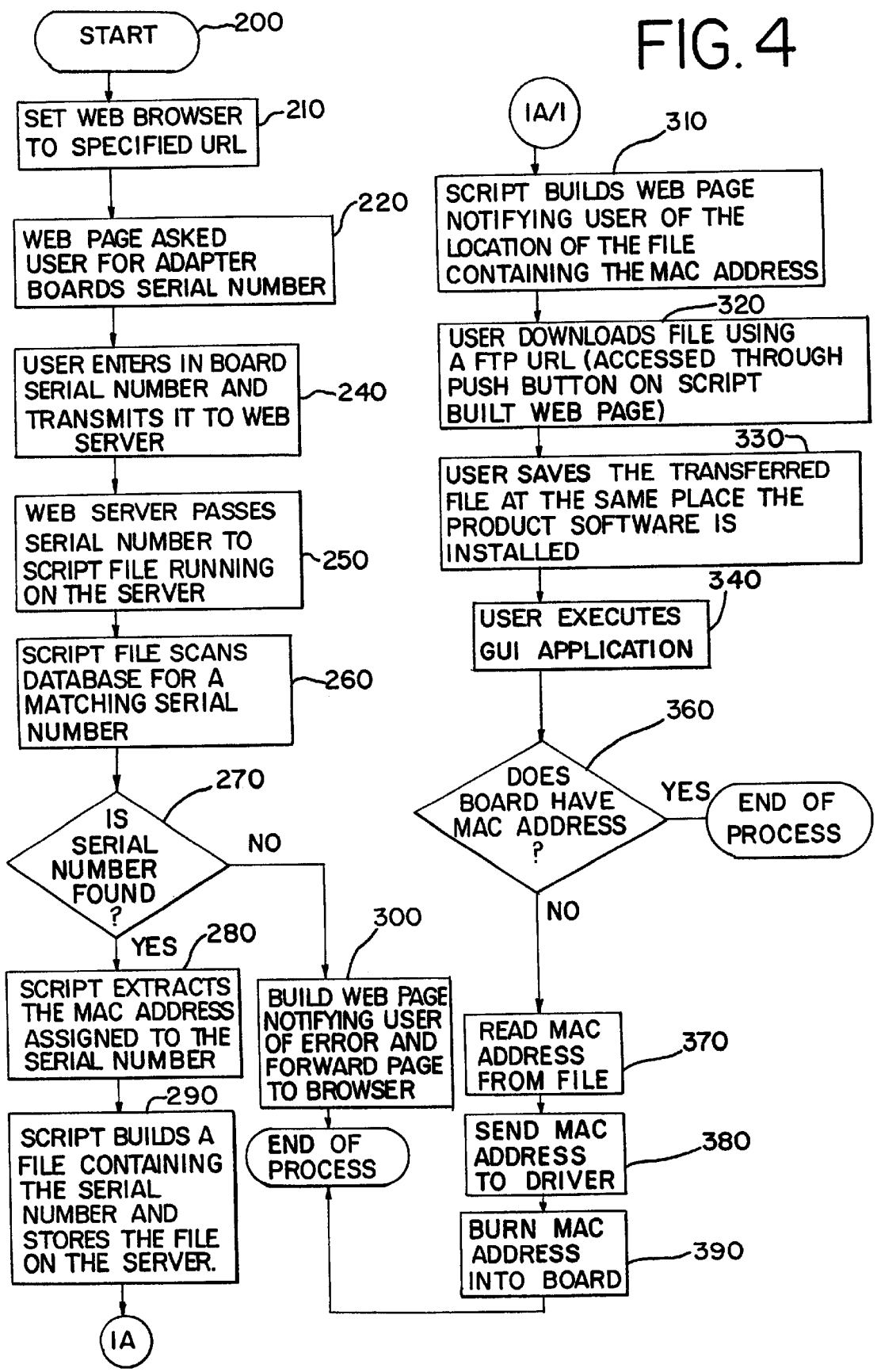

SYSTEM AND METHOD FOR REMOTELY GENERATING, ASSIGNING AND UPDATING NETWORK ADAPTER CARD IN A COMPUTING SYSTEM

BACKGROUND OF THE INVENTION

A. Field of the Invention

The present invention relates to the field of computers and, more particularly, to systems and methods for updating network adapter cards in a computing system. Network adapter cards provide computers with communications resources for communicating over a data network. After a computer user purchases a network adapter card of a particular brand or type, and installs the card in his or her computer, the manufacturer of that type of card may add functions and features to the card. For example, the manufacturer may add a network identifier to the card to enable it to operate using a specific network protocol. If the user's network adapter card is updated, or changed to include the network address, it can also operate using the specific protocol.

B. Background of the Invention

In order for two computers or other items of digital communications equipment to exchange data over a communications medium such as a wide area computer network, both computers have to transmit and receive data in accordance with a set of standards or procedures. These standards or procedures are known as "protocols." As an example, a protocol may assign or designate specific bytes in a packet of data for containing certain information related to the transmission, such as the length of the data, address information, and control characters. Without such protocols, data would be unintelligible to the receiving computer and communication would not be possible. The establishment of protocols enables diverse equipment manufacturers to supply hardware to the public and build computer networks (such as the Internet), with the hardware and networks generally interoperable with equipment of other manufacturers.

The communication industry has standards bodies that formally adopt protocols. Other protocols are "de facto" industry standards, in that the early manufacturers adopt them and other companies selling similar equipment use the same techniques in order to be compatible. As technology advances new standards or protocols are proposed by people working in the industry, typically in the form of a "Request for Comment" document, also referred in the art as an RFC. Persons skilled in the art are familiar with RFC's.

Communications equipment manufacturers provide products that enable host computer systems, such as general-purpose computers running a Windows® operating system from Microsoft Corporation, to access wide area networks such as the Internet. These products take the form of adapter cards for a computer chassis, and external devices that plug into a port on the computer. Applications such as web browsers on the host computer systems may access the communications resources on an adapter card using protocol drivers. Protocol drivers are programs that implement the procedures specified by protocols. The protocol drivers use standard driver interfaces in the operating system to access the communications functions provided by the adapter cards.

In general, communications equipment providers in the communications industry develop protocols in accordance with the Open System Interconnection ("OSI") model is used to describe computer networks. The OSI model consists of seven layers of functions ranging from the physical later at the lowest level, to the application and presentation layer at the highest level. Each layer in a typical network connection may involve functions implemented by one or more protocols.

Communications equipment providers are continuously improving the performance and functional capability of data networks. Such providers may make system-level improvements that arise from the development of entire systems that may implement new protocols at various layers of the OSI model. The implementation of system-level improvements in general-purpose computers may require the use of a new type of adapter card. For example, the development of the Asynchronous Transfer Mode (ATM) over Asynchronous Digital Subscriber Line (ADSL) has led to faster network access for users of general-purpose computers that have an ATM/ADSL adapter card.

Communications equipment providers may also make lower-level improvements to the performance of data networks by improving the software and/or hardware components at one or more layers of the OSI model. Such lower-level improvements may result in changes to existing protocols in the form of new versions of a particular protocol. For example, improvements to the Internet Protocol are reflected in the implementations of IPv4 (Internet Protocol Version 4), IPv5 (Internet Protocol Version 5) and IPv6 (Internet Protocol Version 6).

Lower-level improvements may also result in new protocols. For example, the IPX (Internet Protocol exchange) protocol is a local area network (LAN) communications protocol that is used to move data between a server and/or workstation programs running on different network nodes. IPX defines IPX packets, which are encapsulated and carried by Ethernet or Token-Ring packets or frames being communicated over the local area network.

Lower-level improvements may also result in new interfaces to augment functions performed by one or more protocols. For example, the Interim Link Management Interface (ILMI) is an interim specification defined by the ATM Forum, an industry group for ATM systems. The ILMI incorporates functions that perform a limited subset of the SNMP to provide network management functions between an end user and a public or private network and between a public network and a private network when communicating using ATM.

The situation may arise in which a communications equipment provider may be required to change or update an adapter card to support a lower-level improvement, or even another protocol. In such a situation, new adapter cards may be fully functional in that they support all functions available after the improvements are made. However, users of existing adapter cards in the field would not be able to implement the new functions resulting from the improvements without replacing the adapter card. It would be burdensome and expensive to require a user to replace the adapter card. Moreover, if an update is needed to correct a problem or defect, the manufacturer may have to absorb the cost. If the product is a card that has sold successfully, a large number of cards may need to be replaced.

It would be desirable to be able to update or change an adapter card to provide users with the advantages of improvements in network performance or functional capability without requiring that the adapter card be replaced. One alternative to replacing the adapter card that communications equipment providers may use includes having users return the adapter card to the provider for an upgrade.

The provider modifies the adapter card to include the update and then sends the adapter card back to the user. However, requiring the user to return the adapter card for the upgrade also requires the user to surrender the use of the adapter card for a substantial amount of time.

Solutions for updating an adapter card that is already in the field in which the change is made by the communications equipment provider may appear more burdensome when the change is relatively minor. The improvements in network performance and functional capability may require the addition or the change in a data element stored in non-volatile memory on the adapter card. Such minor changes to the adapter card may be made using utilities that the provider may send to the user. Where the utilities require user input to complete the changes, however, the success of the utilities depends on the accuracy of the user input. For example, the improvements in the network performance and functional capability may require that the adapter card be assigned a Media Access Control (MAC) address, which must be unique to avoid conflicts in communications over the network. In the utility for updating the adapter card, the communications equipment provider may require the user to input the MAC address from the keyboard. If the user input is made with a typographical error, the adapter card may be provided with a non-unique MAC address.

It would be desirable to be able to update or change an adapter card to provide users with the advantages of improvements in network performance or functional capability without requiring any input from the user.

The present invention addresses the problems above by providing a system in which a user connects a host computer to a Web server that determines whether the adapter card used to connect to the Web server has a MAC address. If it does not, a valid MAC address is generated and used to update the adapter card on the host computer.

SUMMARY OF THE INVENTION

In view of the above, a method is provided for updating a network adapter card in a computer system to include a media access control address. The method establishes a connection between the computer system and a remote server. A request is received from the remote server for a serial number assigned to the network adapter card. The serial number of the network adapter card is sent to the remote server. The remote server searches for the media access control address corresponding to the serial number of the network adapter card in a media access control address list. The media access control address is sent to the computer system. The media access control address is stored in the network adapter card.

In another aspect of the present invention, a system is provided for updating a network adapter card in a computer system to include a media access control address. The system includes a communications application operable to issue commands to the adapter driver to establish a network connection over a data network to a remote server. The remote server has a media access control address list from which the remote server retrieves the media access control address. The remote server sends the media access control address to the computer system over the network connection.

An address search program in the computer system determines whether the network adapter card includes a media access control address in the non-volatile memory. A communications application receives the media access control address from the remote server. An address update program stores the media access control address in the non-volatile memory.

In yet a further aspect of the present invention, an improved network adapter card is provided in a computer system for providing a network connection to a data network. The network adapter card includes a non-volatile memory. The improvement has an address search program operable to determine whether the network adapter card includes a media access control address in the non-volatile memory. A communications application connects to a remote server having a media access control address list. The remote server retrieves the media access control address from the media access control address list and sends the media access control address to the computer system over the network connection. The communications application receives the media access control address. An address update program stores the media access control address in the non-volatile memory.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 2 is a block diagram of a system for updating the network adapter card in the computing system of FIG. 1 according to a preferred embodiment of the present invention;

FIG. 3 is a block diagram of the computer system according to the preferred embodiment shown in FIG. 2; and FIG. 4 is a flow chart of a preferred method for updating the network adapter card in FIG. 1.

DETAILED DESCRIPTION OF THE PREFERRED EMBODIMENT

Figure 1:
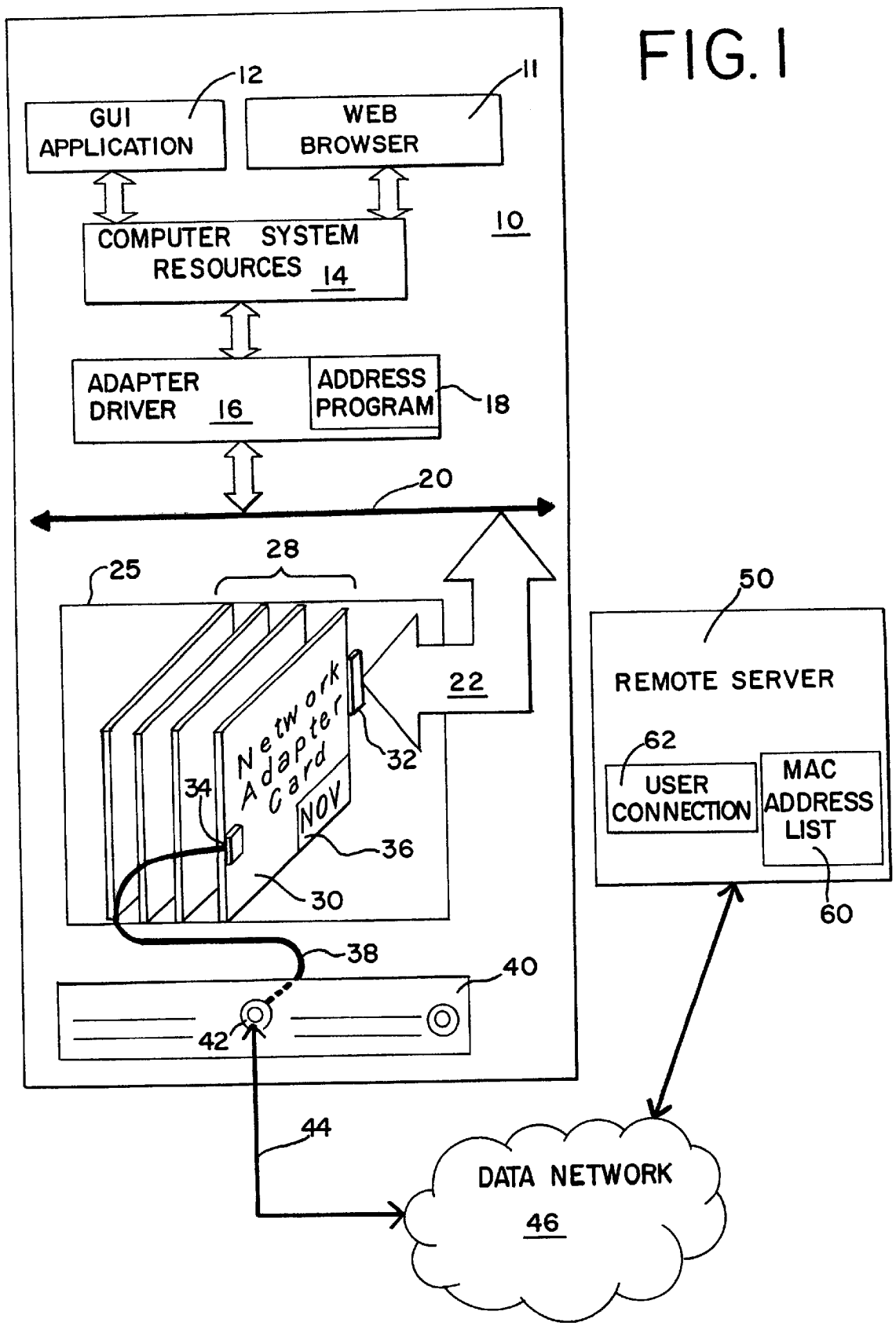
FIG. 1 is a block diagram of a representative computing system having a network adapter card for communicating with a data network.

FIG. 1 is a block diagram of a representative computing system 10 having a network adapter card 30 for communicating with a data network 46. The computing system 10 is a general-purpose computing platform such as a personal computer or a computer workstation. The computing system 10 has basic computing resources 14 that include a processing unit, memory, a user interface, a graphical user interface, an operating system and an input/output system. The resources are basic to most computing systems, and are particularly included in computers having a Pentium processor and using the Windows® operating system from Microsoft, which are used in a preferred embodiment of the present invention.

The computer system 10 also includes a chassis 25 in which a user may install cards 28 that enhance the functional capability of the computer system 10. The cards 28 are circuit boards that perform hardware functions that may be controlled by software drivers. Software drivers receive requests for hardware resources provided by the cards 28 and communicate the requests to the cards 28 over a bus system 20. The bus system 20 includes a peripheral interface 22 (e.g. PCI, or Peripheral Component Interconnect) to the cards 28 at connectors 32 corresponding to each card in the chassis 25. Software drivers are typically provided by card manufacturers as part of the product that is distributed with the card. A user may purchase a card, install the card in the chassis 25 and install the software driver for the card in the computer system storage device, e.g hard disk.

Applications may access the software driver using a standard interface, preferably provided with the operating system, which simplifies the access that software components have to hardware functions. The Windows® operating system includes standard interfaces such as the Basic Input/Output System (BIOS), Virtual Driver Interface (VxD®) and the Network Driver Interface Specification (NDIS).

A standard interface may include other functions that augment the basic functions performed by the hardware. For example, protocol drivers, which are software components that perform the functions defined in specific protocols, may be included in a standard interface for cards that perform communications functions. The NDIS is an example of a standard interface that includes protocol drivers that perform communications protocols for communicating over the data network 46. Because standard interfaces are well known to those of skill in the art, no further description is required.

The data network 46 may include any network that may be used for communicating data, and preferably includes the Internet and any network that provides access to the Internet.

The computer system 10 in FIG. 1 includes a network adapter card 30 that provides the computer system 10 with a network connection 44 to the data network 46. The network adapter card 30 is a type of network interface card that includes hardware that provides the physical connection to the data network 46. The network adapter card 30 includes a second connector 34 with a hardware interface to a panel connection 38. The panel connection 38 is connected to a plug 42 on a panel 40 that is accessible to the user to enable the user to connect through the network connection 44 to the computer system 10.

The hardware comprising the network adapter card 30, the connectors 32, 34, the panel connection 38, and the plug 42 is designed to function according to requirements, standards or conventions dictated by the network connection 44 used for the physical connection. For example, a modem is a network adapter card 30 that provides communications functions for communicating over a public switched telephone network. The network connection 44 used by a modem is the telephone infrastructure, and the plug 42 and panel connection 38 includes any suitable serial connector such as the RJ-11 and wires used to connect to it. Different protocols exist to govern many of the modem's functions, such as error correction, modulation, data formats, etc. Telephone service providers that use the public switched telephone network to deliver service may use digital subscriber lines (DSL), which includes data lines and voice lines to provide high-speed data access in the distribution equipment used to connect users to the network. The data lines are separated from the voice lines by POTS (Plain Old Telephone Service) splitters at the customer premises. The separate lines are connected to the Central Office Switch, at which the voice lines are connected to the public switched telephone network and the data lines are connected to a data network.

In a preferred embodiment, the network adapter card 30 is an Asymmetric Digital Subscriber Line (ADSL) adapter that includes support for the Asynchronous Transfer Mode (ATM) protocol (i.e. ATM/ADSL).

Some network interface cards known in the art operate in networks that require a controlled access to network mediums that are shared by two or more entities. The access to the network medium is controlled using procedures defined in protocols addressing the lower half of the data link layer (i.e. layer 2 of the OSI model). For example, network interface cards may use a token ring, token bus, or collision sense multiple access/collision detect (CSMA/CD) protocol and other known protocols. A network interface card that requires media access control is assigned a unique address, known in the art as a MAC address, that distinguishes it from other network adapter cards 30 with which it shares the network medium. The communications industry has defined a MAC address to be a 48-bit number, unique to each adapter card and assigned to each adapter card at the time of manufacture.

Some network interface cards do not operate in networks in which the medium is shared in a manner requiring control over access to the network medium. Modems, for example, establish dedicated connections to other network members to communicate data.

The network adapter card 30 in FIG. 1 is a network interface card that does not require media access control. Therefore, it is not assigned a media access control address. Nevertheless, the protocols and tools that may be used in conjunction with the network adapter card 30 are subject to changes and modifications that may require it to have a MAC address. One advantage of embodiments of the present invention is that the network adapter card 30 may be updated to include a MAC address, or any other such type of network address, without requiring the user to remove the card 30 from the computer system 10.

The network adapter card 30 includes a non-volatile memory 36 for storing programs and data for communications functions performed on the network adapter card 30. The non-volatile memory 36 may include any non-volatile memory device, such as, a flash memory, an electrically erasable programmable read-only memory, etc. The non-volatile memory 36 may store a MAC address that may be assigned to the network adapter card 30. The computer system 10 includes an adapter driver 16 for controlling the network adapter card 30. The adapter card 16 includes an address program 18 that determines whether the network adapter card 30 has a MAC address assigned to it. The address program 18 may also store a MAC address that has been assigned to the network adapter card 30 in the non-volatile memory 36. The address program 18 stores, or burns, the MAC address in the non-volatile memory 36 using whatever technique is appropriate for the particular non-volatile memory device.

The computer system 10 also includes a communications application 11 and a graphical user interface (GUI) application 12 that uses the network adapter card 30 to connect to a remote server 50. The remote server 50 includes a MAC address list 60 in which MAC addresses are stored for network adapter cards 30 identified by a device identifier, such as a serial number. The MAC address list 60 may be a data base program or any other type of data element that may be stored in a computer storage system. The user invokes the communications application 11 and the GUI application 12 to establish a network connection with the remote server 50. The communications application 11 is preferably a web browser and is used to perform data transfers and information exchange over the data network 46. Any other program may be used as the communications application 11, however, such as a terminal emulator, or a graphical user interface program that connects to the network by other than the World Wide Web.

The GUI application 12 is used to execute programs that update the network adapter card 30. The GUI application 12 is described further with reference to FIG. 3.

A user connection program 62 on the remote server 50 provides the user of the computer system 10 with an interactive process for exchanging information. The user connection program 62 may include a command line process in which user input is made with responses to queries and commands that are processed by programs on the remote server 50. In a preferred embodiment (described below with reference to FIG. 2), the user connection program 62 is a HyperText Transport Protocol server using a HyperText Meta-Language (HTML) script that interacts with the communications application 11 to provide buttons, menus and other graphical user interface objects for exchanging information. The interaction between the user connection program 62 and the communications application 11 is not limited to the use of command lines or GUI objects. Any known process for exchanging information between an application on the computer system 10 and the remote server 50 may be used in embodiments of the present invention.

The user connection program 62 on the remote server 50 queries, or requests that the user send the device identifier to the remote server 50. The remote server 50 retrieves the MAC address corresponding to the device identifier from the MAC address list 60. In a preferred embodiment, the remote server 50 is a World-Wide Web (Web) server on an Internet site that is under the control of the manufacturer of the network adapter card 30. The manufacturer creates the MAC address list 60 by identifying the network adapter cards 30 that it distributed without a MAC address according to a device identifier, such as a serial number, and assigning unique MAC addresses accordingly.

FIG. 2 shows a Web server 150 having a HyperText Transport Protocol (HTTP) server 170, an HTML Web page 180, a File Transport Protocol (FTP) server 172, and a Practical Extraction and Report Language (PERL) script 164. The computer system 10 is connected to the Web server 150 over a network connection 140 on the Internet 190. The user establishes the network connection 140 using techniques and resources that are known to those of ordinary skill in the art (e.g. ADSL, ISDN, T1, cable modem, and other network connection systems). It is not necessary that the network connection 140 be made using the network adapter card 30.

The user invokes the communications application 11, which is preferably a Web viewer, or Browser. The user enters or selects an HTTP Universal Resource Locator (URL) that has been designated by the Web server 150 provider to invoke the HTML Web page 180. The HTML web page 180 includes a query for the device identifier of the network adapter card 30. The query may be template, or a text block, displayed as a form for user entry on the computer system display. The user centers the device identifier, which is preferably the serial number assigned to the network adapter card 30 by the manufacturer in response to the query. The HTTP server 170 receives the serial number and invokes the PERL script 164 to search the MAC address list 68 for the serial number to retrieve the MAC address that corresponds to the serial number. One ordinary skill in the art will appreciate that any type of program or script may be used to search the MAC addresses list 68. In particular, any Common Gateway Interface (CGI), known to those of ordinary skill in the art, may be used.

The PERL script 164 stores the MAC address found in the MAC address list 68 in a saved MAC address file 168. The saved MAC address file 168 is assigned a file name sent to the HTML Web page 180 for display to the user.

The user enters a file transfer protocol URL (FTP URL) specifying the name of the MAC address file 168 at the computer system 10. The HTTP server 170 receives the FTP URL and invokes the FTP server 172. The FTP server 172 is commanded to retrieve the MAC address file 168. The HTTP server 170 sends the file to the user at the computer system 10 over the network connection 140 on the Internet 190.

One of ordinary skill in the art will appreciate that the HTTP server 170, the FTP server 172 and HTML web pages are known in the art and are used in a preferred embodiment that uses the World Wide Web. However, any suitable alternative systems available on the World-Wide Web may also be used In addition, the present invention is not limited to the use of the Web. A terminal emulation program may be used on the computer system 10 to connect to an interface to the FTP server 172 using a command line interface. For example, a terminal emulation program may be used to dial into a bulletin board system (BBS) using a command line interface and retrieving the MAC address file 168 using Z-Modem, X-Modem, or some other type of file transfer protocol.

FIG. 3 is a block diagram of the computer system 10 of FIG. 1 showing components for verifying whether the network adapter card 30 has a MAC address and for storing a MAC address received from the Web server 150 in FIG. 2.

The user may determine whether the network adapter card 30 includes a MAC address by invoking the address program 18 from the GUI application 12. The address program 18 includes an address search program 186 that issues a request to the network adapter card 30 for a MAC address. If the network adapter card 30 does not include a MAC address, an address file program 187 determines whether the computer system 10 includes the MAC address file 184. The MAC address file 184 is the file retrieved from the Web server 150 using the system described with reference to FIG. 2. If the computer system 10 includes the MAC address file 184, the GUI application 12 reads the file from disk storage 120. If the computer system 10 does not include the MAC address file 184, the user connects to the Web server 150 using the system described with reference to FIG. 2.

The address program 18 includes an address update program 188 for reading a MAC address from the MAC address file 184. The address update program 188 issues a command to the network adapter card 30 with the MAC address as a parameter. The MAC address is stored, or burned (depending on the type of non-volatile memory device 36 is used as described with reference to FIG. 1) in the non-volatile memory.

Once the network adapter card 30 includes the MAC address, new functions that require the MAC address may be performed. For example, in a preferred embodiment, the network adapter card 30 is an ATM/ADSL adapter. For normal communications operations, a MAC address is not needed. However, the MAC address permits the network adapter card 30 to operate as a Simple Network Management Protocol (SNMP) client thereby providing enhanced network management functions.

FIG. 4 is a flowchart of a method for updating the network adapter card 30 to include a MAC address according to a preferred embodiment of the present invention. The method starts at step 200 when the user invokes the communications application 11 (shown in FIG. 1). In a preferred embodiment, the communications application 11 is a Web browser as known in the art. The user sets the Web browser to an URL specified, preferably, by the manufacturer as a Web site for updating the network adapter card 30 at step 210. The Web site invokes a Web page that asks the user for the serial number of the card at step 220. The user enters the serial number as instructed by the Web page and the Web browser transmits the serial number to the Web server at step 240.

At step 250, the Web server receives the serial number and sends the serial number to a PERL script 164 (shown in FIG. 2) file running on the server. The script file searches a database for the serial number at step 260.

A decision block 270, determines if the serial number is in the data base, which may include the MAC address file list 60 in FIG. 1 having the MAC addresses stored with corresponding serial numbers. If the serial number is not found, the Web server displays a web page reporting an error to the user at step 300 and the process ends. At step 290, the script build builds the MAC address file 184 (shown in FIG. 2) and stores the file on the Web server. The script then displays a Web page that informs the user of the name, or location of the file containing the MAC address at step 310. At step 320, the user invokes the FTP server to download the file with an FTP URL, which is preferably connected to a GUI button. At step 330, the user stores the file in the computer system 10, preferably in a directory containing other programs that relate to the network adapter card 30.

At this point, the user may end the process and proceed to step 340 at some other time. Once the MAC address file is stored in the computer system 10, the user can use it at any time. At step 340, the user executes the GUI application 12 (shown in FIG. 1). The GUI application 12 checks the network adapter card 30 to determine if it already has a MAC address at decision block 360. If the card 30 has a MAC address, the GUI application 12 stops.

If the card 30 does not have a MAC address, the GUI application 12 reads the MAC address from the MAC address file at step 370. The GUI application 12 sends the MAC address to the network adapter card 30 where it is burned into non-volatile memory using techniques that are well known to those of ordinary skill in the art.

While the invention has been described in conjunction with presently preferred embodiments of the invention, persons of skill in the art will appreciate that variations be made without departure from the scope and spirit of the invention. This true scope and spirit is defined by the appended claims, interpreted in light of the foregoing.

We claim:

1. A method for remotely updating a network adapter card installed in a computer system to include a media access control address, the method comprising the steps of:
   establishing a connection between the computer system and a remote server;
   receiving a request from the remote server for a serial number assigned to the network adapter card;
   sending the serial number of the network adapter card to the remote server;
   the remote server searching for the media access control address corresponding to the serial number of the network adapter card in a media access control address list;
   sending the media access control address to the computer system; and
   storing the media access control address in the network adapter card.

2. The method of claim 1 further comprising the steps of:
   the remote server storing the media access control address in an address file having a file name;
   sending the file name to the computer system; and
   the computer system requesting a download of the address file; wherein the step of sending the media access control address to the computer system includes the step of downloading the address file to the computer system.

3. The method of claim 2 further comprising the steps of:
   before the step of establishing the connection to the remote server, determining whether the network adapter card includes the media access control address; and
   continuing to the step of establishing the connection to the remote server when the network adapter card does not include the media access control address.

4. The method of claim 3 further comprising the steps of:
   before the step of continuing to the step of establishing the connection to the remote server, determining whether the computer system includes the address file; and
   reading the media access control address from the address file when the computer system includes the address file.

5. An improved network adapter card in a computer system for providing a network connection to a data network, the network adapter card comprising a non-volatile memory, the improvement comprising:
   an address search program operable to determine whether the network adapter card includes a media access control address in the non-volatile memory;
   a communications application to connect to a remote server having a media access control address list, the remote server being operable to retrieve the media access control address from the media access control address list and to send the media access control address to the computer system over the network connection, the communications application being operable to receive the media access control address; and
   an address update program to store the media access control address in the non-volatile memory.

6. The improvement of claim 5 wherein the remote server creates an address file containing the media access control address, the improvement further comprising:
   an address file program operable to determine if the computer system includes an address file in a data storage system, the address file including the media access control address; and
   wherein the communications application receives and stores the address file from the remote server, the address update program being operable to read the media access control address from the address file and to store the media access control address in the non-volatile memory.

7. The improvement of claim 5 further comprising a user interface program that enables a user to cause the execution of the address search program.

8. The improvement of claim 7 wherein the user interface program enables the address update program.

9. The improvement of claim 7 wherein the user interface program includes a graphical user interface objects for causing the execution of the address search program.

10. The improvement of claim 9 wherein the user interface program includes a graphical user interface objects for causing the execution of the address update program.

11. The improvement of claim 5 wherein the communications application is a World-Wide Web browser.

12. The improvement of claim 5 wherein the communications application is a terminal emulation program.

13. A system for updating a network adapter card in a computer system to include a media access control address, the system comprising:
   a communications application operable to issue commands to the adapter driver to establish a network connection over a data network to a remote server;

the remote server having a media access control address list the remote server being operable to retrieve the media access control address from the media access control address list and to send the media access control address to the computer system over the network connection;

an address search program in the computer system operable to determine whether the network adapter card includes a media access control address in the non-volatile memory; and an address update program operable to receive the media access control address from the remote server and to store the media access control address in the non-volatile memory.

14. The system of claim 13 further comprising:

an address file created by the remote server, the remote server being operable to store the MAC address in the address file;

an address file program operable to determine if the computer system includes the address file in a data storage system; and wherein the communications application receives and stores the address file from the remote server, the address update program being operable to read the media access control address from the address file and to store the media access control address in the non-volatile memory.

15. The system of claim 13 further comprising a user interface program that enables a user to cause the execution of the address search program.

16. The system of claim 15 wherein the user interface program enables the address update program.

17. The system of claim 15 wherein the user interface program includes a graphical user interface objects for causing the execution of the address search program.

18. The system of claim 17 wherein the user interface program includes a graphical user interface objects for causing the execution of the address update program.

19. The system of claim 13 wherein the communications application is a World-Wide Web browser.

20. The system of claim 13 wherein the communications application is a terminal emulation program.

21. The system of claim 13 wherein the remote server is a World-Wide Web server that includes a hypertext transfer protocol connected to a Hypertext Meta-Language Web page.

22. The system of claim 21 wherein the remote server includes a common gateway interface for searching the MAC address list for a MAC address.

23. The system of claim 22 wherein the common gateway interface includes a PERL script.

24. The system of claim 14 wherein the remote server includes a file transport protocol server for creating the address file.

* * * * *